(12) United States Patent
Shao et al.

(10) Patent No.: US 10,488,543 B2
(45) Date of Patent: Nov. 26, 2019

(54) ROGUE OBJECT DETECTION ALGORITHM FOR WIRELESS CHARGING NOTIFICATION

(71) Applicant: Intel Corporation, Santa Clara, CA (US)

(72) Inventors: Lei Shao, Sunnyvale, CA (US); Xintian E. Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 310 days.

(21) Appl. No.: 15/086,609

(22) Filed: Mar. 31, 2016

(65) Prior Publication Data

US 2017/0285207 A1    Oct. 5, 2017

(51) Int. Cl.
| | |
|---|---|
| *G01V 3/02* | (2006.01) |
| *G01R 21/133* | (2006.01) |
| *H02J 7/02* | (2016.01) |
| *G01V 3/10* | (2006.01) |
| *H02J 50/12* | (2016.01) |
| *H02J 50/80* | (2016.01) |
| *H02J 50/60* | (2016.01) |

(52) U.S. Cl.
CPC .............. *G01V 3/02* (2013.01); *G01V 3/101* (2013.01); *H02J 7/025* (2013.01); *H02J 50/12* (2016.02); *H02J 50/60* (2016.02); *H02J 50/80* (2016.02)

(58) Field of Classification Search
CPC .............................. H02J 7/025; G01R 21/133
See application file for complete search history.

(56) References Cited

U.S. PATENT DOCUMENTS

| | | |
|---|---|---|
| 2014/0015335 A1 | 1/2014 | Lee et al. |
| 2014/0253028 A1 | 9/2014 | Lee et al. |
| 2015/0233990 A1 | 8/2015 | Lee et al. |
| 2015/0271673 A1 | 9/2015 | Lord et al. |

FOREIGN PATENT DOCUMENTS

| | | |
|---|---|---|
| WO | 2015-176246 A1 | 11/2015 |
| WO | 2017172080 A1 | 10/2017 |

OTHER PUBLICATIONS

International Search Report and Written Opinion received for International Application No. PCT/US2017/017815, dated May 18, 2017, 16 pages.
International Preliminary Report on Patentability received for International Application No. PCT/US2017/017815, dated Oct. 11, 2018, 13 pages.

*Primary Examiner* — Seahvosh Nikmanesh
(74) *Attorney, Agent, or Firm* — Spectrum IP Law Group LLC

(57) ABSTRACT

The disclosure generally relates to methods, system and apparatus to detect a rogue object placed on an A4WP charging pad (interchangeably, charging mat). In one embodiment, presence of a rogue object on a charging pad is detected by measuring currents and voltages from sensor circuits on PTU and apply machine learning algorithms to develop power leakage algorithm. The algorithm identifies false objects placed on the charging pad and obviates false alarm while simultaneously detecting presence of a rogue object which can damage the A4WP wireless charging system.

10 Claims, 6 Drawing Sheets

ROGUE OBJECT DETECTION ALGORITHM FOR WIRELESS CHARGING NOTIFICATION

BACKGROUND

Field

The disclosure generally relates to a method, system and apparatus to optimize wireless charging. Specifically, the specification relates to a method, system and apparatus to optimize wireless charging by providing PTU notification to change PTU state into latching fault state when a rogue object is detected on the charging pad.

Description of Related Art

Wireless charging or inductive charging uses a magnetic field to transfer energy between two devices. Wireless charging can be implemented at a charging station. Energy is sent from one device to another device through an inductive coupling. The inductive coupling is used to charge batteries or run the receiving device. The Alliance for Wireless Power (A4WP) was formed to create industry standard to deliver power through non-radiative, near field, magnetic resonance from the Power Transmitting Unit (PTU) to a Power Receiving Unit (PRU).

The A4WP defines five categories of PRU parameterized by the maximum power delivered out of the PRU resonator. Category 1 is directed to lower power applications (e.g., Bluetooth headsets). Category 2 is directed to devices with power output of about 3.5 W and Category 3 devices have an output of about 6.5 W. Categories 4 and 5 are directed to higher-power applications (e.g., tablets, netbooks and laptops).

PTUs of A4WP use an induction coil to generate a magnetic field from within a charging base station, and a second induction coil in the PRU (i.e., portable device) takes power from the magnetic field and converts the power back into electrical current to charge the battery. In this manner, the two proximal induction coils form an electrical transformer. Greater distances between sender and receiver coils can be achieved when the inductive charging system uses magnetic resonance coupling. Magnetic resonance coupling is the near field wireless transmission of electrical energy between two coils that are tuned to resonate at the same frequency.

Wireless charging is particularly important for fast charging of devices including smartphones, tablets and laptops. There is a need for improved wireless charging systems to extend the active charging area and to improve coupling and charging uniformity while avoiding disruption of nearby rogue objects that are not being charged and may interfere with the generated magnetic field.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Figure 1:
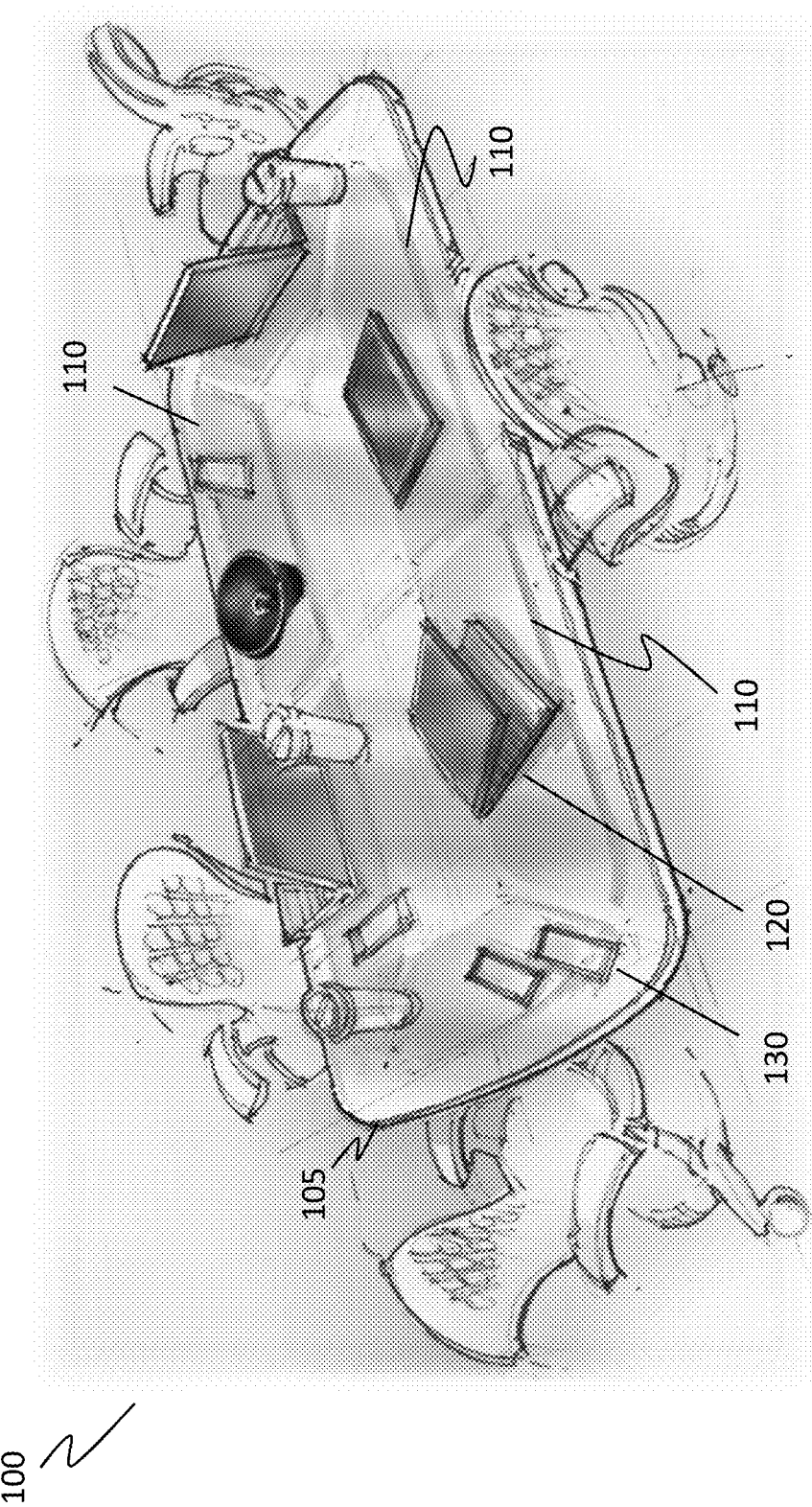
FIG. 1 illustrates an exemplary wireless charging environment according to one embodiment of the disclosure.

Certain embodiments may be used in conjunction with various devices and systems, for example, a mobile phone, a smartphone, a laptop computer, a sensor device, a Bluetooth (BT) device, an Ultrabook™, a notebook computer, a tablet computer, a handheld device, a Personal Digital Assistant (PDA) device, a handheld PDA device, an on board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AV) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Institute of Electrical and Electronics Engineers (IEEE) standards (IEEE 802.11-2012, IEEE Standard for Information technology-Telecommunications and information exchange between systems Local and metropolitan area networks—Specific requirements Part 11: Wireless LAN Medium Access Control (MAC) and Physical Layer (PHY) Specifications, Mar. 29, 2012; IEEE 802.11 task group ac (TGac) ("IEEE 802.11-09/0308r12—TGac Channel Model Addendum Document"); IEEE 802.11 task group ad (TGad) (IEEE 802.11ad-2012, IEEE Standard for Information Technology and brought to market under the WiGig brand—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing Wireless HDTM specifications and/or future versions and/or derivatives thereof, units and/or devices which are part of the above networks, and the like.

Some embodiments may be implemented in conjunction with the BT and/or Bluetooth low energy (BLE) standard. As briefly discussed, BT and BLE are wireless technology standard for exchanging data over short distances using short-wavelength UHF radio waves in the industrial, scientific and medical (ISM) radio bands (i.e., bands from 2400-2483.5 MHz). BT connects fixed and mobile devices by building personal area networks (PANs). Bluetooth uses frequency-hopping spread spectrum. The transmitted data are divided into packets and each packet is transmitted on one of the 79 designated BT channels. Each channel has a bandwidth of 1 MHz. A recently developed BT implementation, Bluetooth 4.0, uses 2 MHz spacing which allows for 40 channels.

Some embodiments may be used in conjunction with one way and/or two-way radio communication systems, a BT device, a BLE device, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like. Some demonstrative embodiments may be used in conjunction with a WLAN. Other embodiments may be used in conjunction with any other suitable wireless communication network, for example, a wireless area network, a "piconet", a WPAN, a WVAN and the like.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Electromagnetic induction based Wireless charging and Near Field Communication (NFC) are based on inductive coupling between two coils. Wireless charging based on A4WP uses 6.78 MHz industrial, scientific or medical (ISM) frequency band to deliver power between wireless charger and device, while NFC (and some other RFID technologies) uses 13.56 MHz ISM frequency band to deliver power and data between devices. It should be noted that disclosed embodiments may be implemented with Air Fuel Alliance or various industry standards for wireless charging.

FIG. 1 illustrates an exemplary wireless charging environment according to one embodiment of the disclosure. In FIG. 1, conference room 100 is shown with wireless charging pads or mats (i.e., PTUs) 110 positioned on desk 105. Each PTU 110 is designated to support one or more PRUs. While FIG. 1 shows PRUs including laptop 120 and smart devices 130, the disclosed principles are not limited thereto and may include any device capable of wireless charging.

Figure 2:
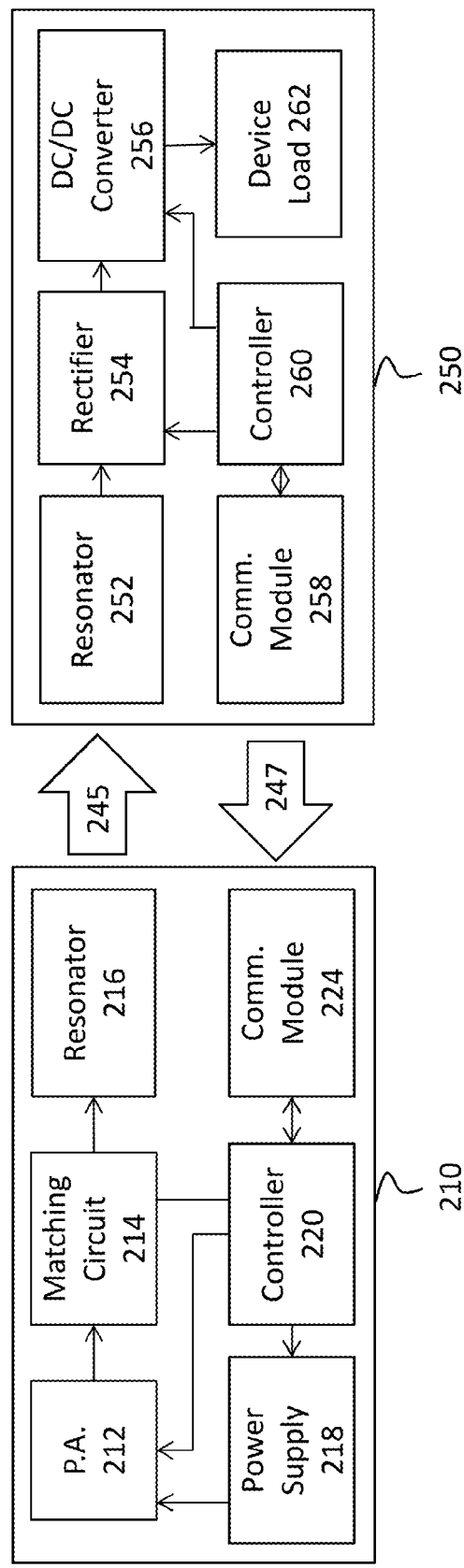
FIG. 2 schematically illustrates conventional A4WP architecture.

FIG. 2 schematically illustrates conventional A4WP architecture. Specifically, FIG. 2 shows PTU 210 and PRU 250. PTU 210 can be any conventional wireless charging station. PTU 210 includes power supply 218, power amplifier (PA) 212, matching circuit 214, controller 220, resonator coil 216 (interchangeably, resonator) and communication module 224. Communication module 224 may define BLE communication platform to transceive BLE packets and to communicate the packets to controller 220. PA 212 receives primary power from power supply 218 (which may be an AC source) and generates an amplified A4WP power signal according to instructions from controller 220. Matching circuit 214 receives A4WP power signals from PA 212 and provides substantially constant power to resonator 216. Resonator 216 may include one or more resonator coils to convert output from matching circuit 214 to magnetic field for a wireless device positioned within the charging zone of PTU 210.

PRU 250 may define any device under charge (DUC) which is proximal to PTU 210. PRU 250 is shown with resonator coil 252, rectifier 254, DC/DC converter 256, communication module 258, controller 260 and device load 262. Communication module 258 includes BLE communication platform to communicate 247 with communication module 224 of PTU 210. Resonator coil 252 receives magnetic field 245 of PTU resonator 216. Rectifier 254 conforms magnetic field (power) received at resonator 252 and provides appropriate signal to DC/DC converter 256. Controller 260 of PRU 250 communicates with resonator 252 and rectifier 254 in order to manage received power. The output of DC/DC converter 256 powers device load (e.g., battery) 262.

The charging pad of a conventional PTU device (i.e., A4WP wireless charging class 2 and above) is large enough to allow multiple devices including smart phone, tablet, laptop, etc. to be charged simultaneously. However, the user may accidentally place an unrelated object (e.g., CD/DVD, metal plate, LCD panel, sunglasses, etc.) on the charging mat. Such objects, also known as rogue objects, can absorb heat and cause serious safety issues. Other objects can cause reactance shift to power amplifier (PA) of the PTU and may damage the PA. Because the conventional PTU coil is not designed to generate evenly distributed electrical-magnetic field and the default simple load variation detection is not robust, moving the A4WP chargeable devices on the surface of the charging pad may trigger false alarm which may cause the PTU to shut down unexpectedly. These events degrade user experience of A4WP wireless charging. Conventional A4WP systems provide no solution to prevent false alarm or to detect rogue objects. The disclosed embodiments provide an important safety feature to address these deficiencies.

In one embodiment, the disclosure relates to a method, system and device for detecting presence of a rogue object on a charging pad. In another embodiment, the disclosure relates to an A4WP charging pad with a rogue objection detection mechanism. In still another embodiment, the disclosure provides a rogue objection detection algorithm which may be used as standalone hardware, software or a combination of hardware and software. In still another embodiment, the rogue object detection is augmented with a false-positive detection system to identify and filter a false-positive detection to avoid system shutdown.

Figure 3:
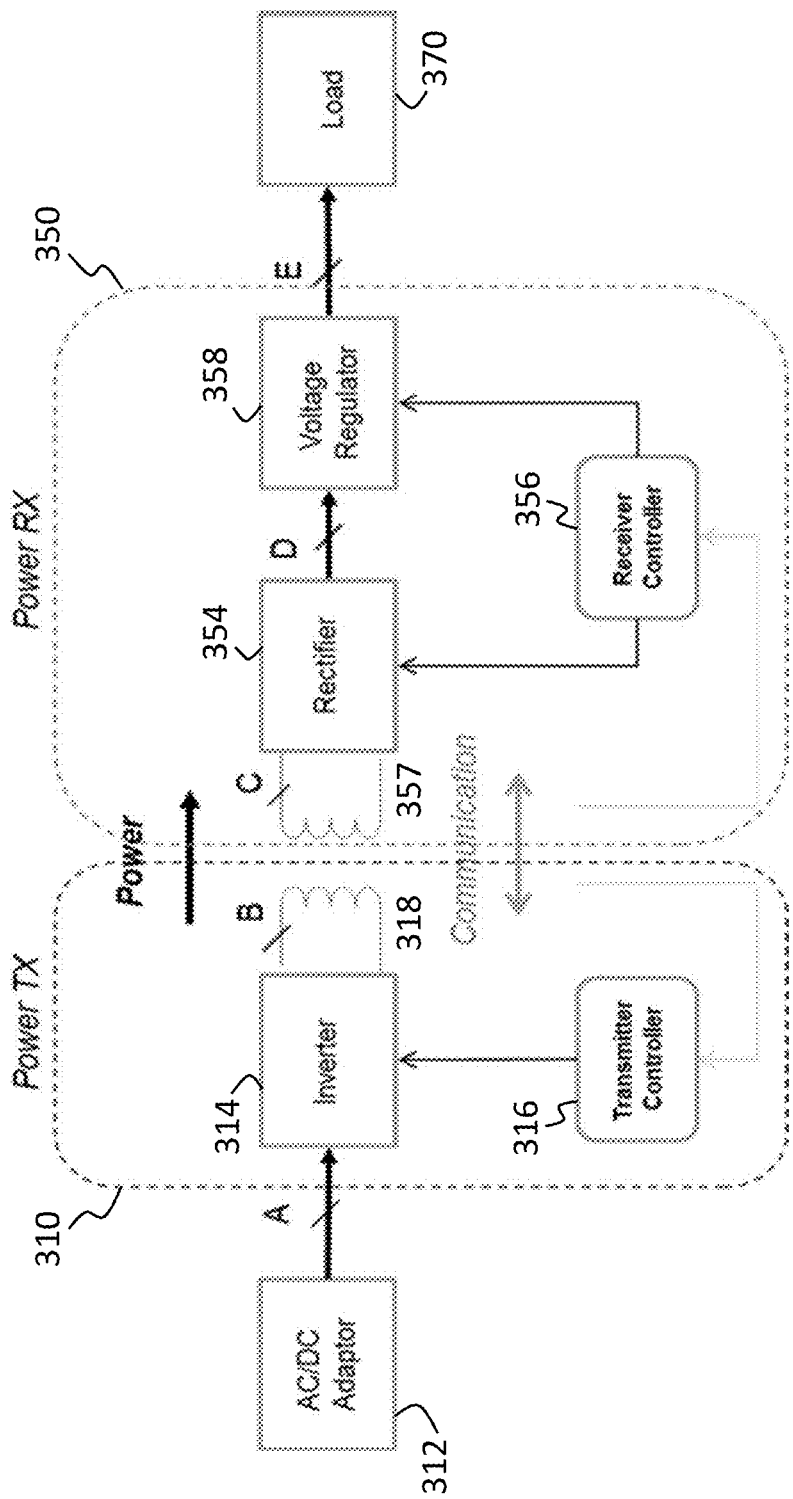
FIG. 3 illustrates a conventional A4WP wireless system architecture having a PTU and a PRU.

FIG. 3 illustrates a conventional A4WP wireless system architecture having a PTU and a PRU. In FIG. 3, AC/DC adaptor 312 communicates with PTU 310. The AC/DC adaptor may be any conventional power supply. PTU 310 includes Inverter 314, Transmitter Controller 316 and Coil Resonator 318. PRU 350 includes Coil Resonator 357, Rectifier 354 and Voltage Regulator 358. Controller 356 of PRU 350 communicates with Controller 316 of PTU 310. The communication may be through BLE packets. The communication includes information that enables PTU 310 to generate optimal magnetic field for charging PRU 350. For example, the communication may indicate power received at rectifier 354 as measured by current and/or voltage across Coil Resonator 357, rectifier 354 or other regions.

During charging operation, Inverter 314 receives input from Controller 316 and conditions magnetic waveform generated by Coil Resonator 318. Inverter 314 may include a power amplifier and a matching circuit as discussed in relation to FIG. 2. Magnetic power generated by Coil Resonator 318 of PTU 310 is received by Coil Resonator 357 of PRU 350. Rectifier 354 converts the magnetic signals received at Coil Resonator 357 to DC voltage. Voltage Regulator 358 further conditions the received DC voltage to a constant voltage prior to energizing load 370. Load 370 may define a device under charge (DUC). The conventional PTUs are incapable of efficiently receiving and converting power form alternative sources.

In an exemplary embodiment, rogue objects are detected by comparing power generated at PTU 310 with power received at PRU 350. If the relationship between generated and received power is below a given threshold, then controller 316 my take action to reduce output power or signal the user to remove the rogue object. Different factors may be considered for determining efficiency depending on the operating state of the charging pad. Similarly, different thresholds may be used to detect presence of a rogue object. Exemplary detection techniques and thresholds are discussed below.

Figure 4A:
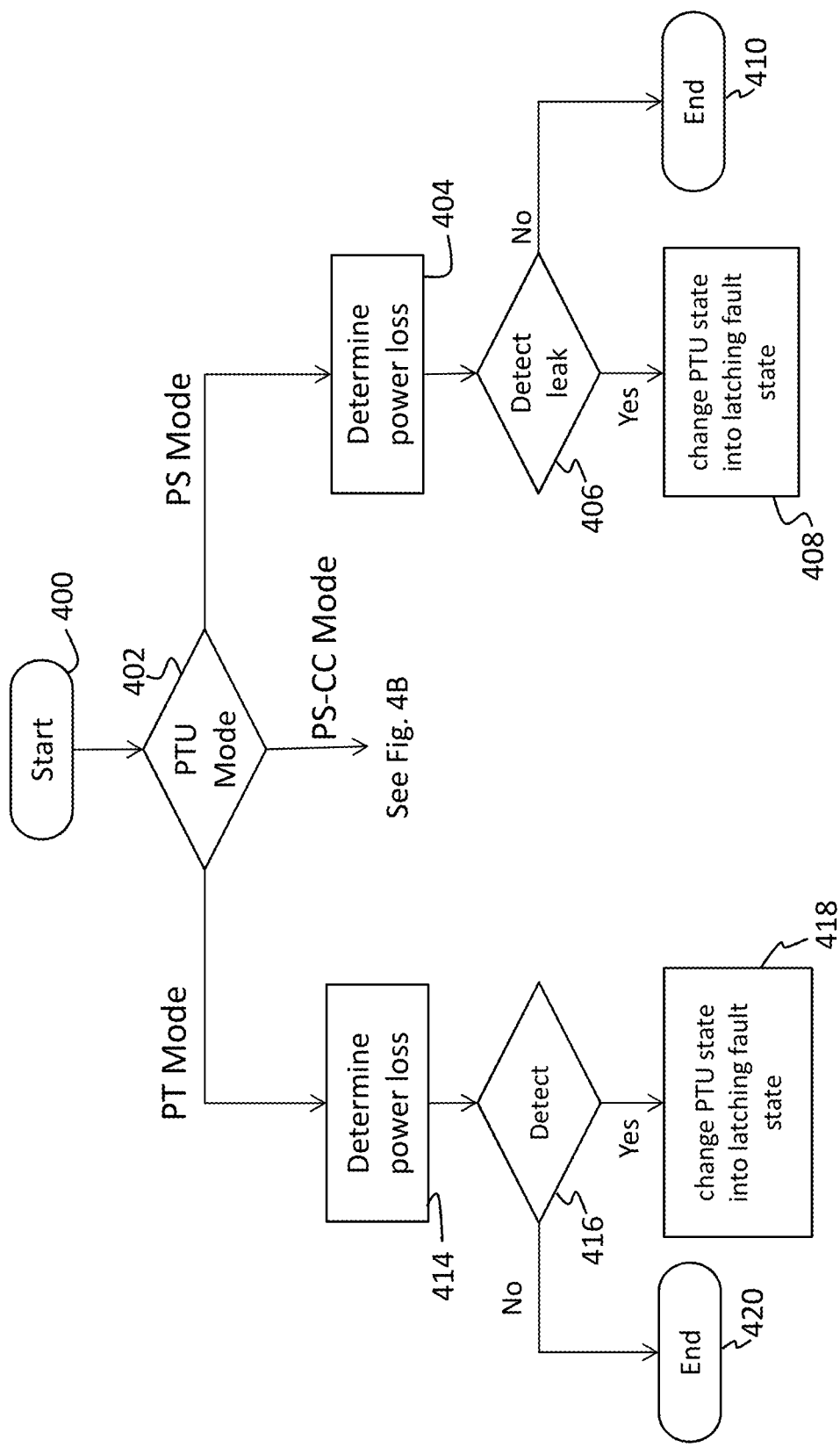
FIG. 4A shows an exemplary algorithm for detecting a rogue object according to one embodiment of the disclosure.
Figure 4B:
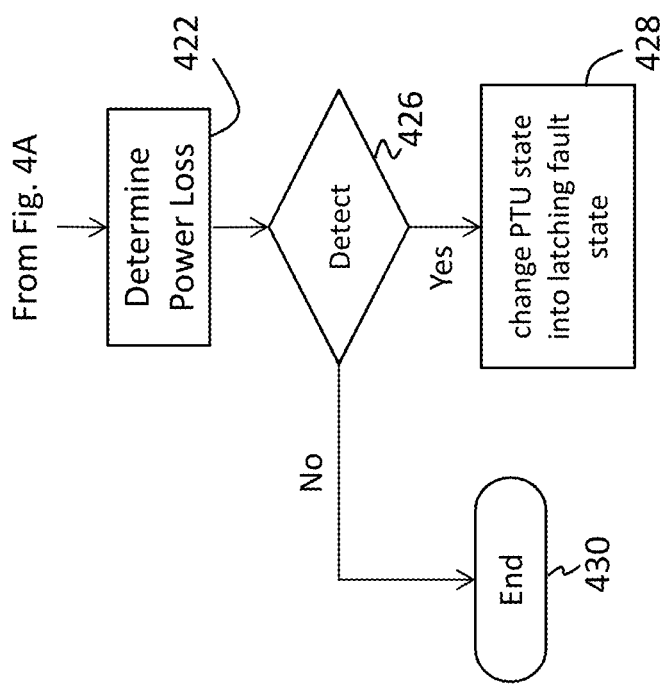
FIG. 4B is a continuation of FIG. 4A showing exemplary algorithm for detecting a rogue object according to one embodiment of the disclosure.

FIGS. 4A and 4B show an exemplary algorithm for detecting a rogue object according to one embodiment of the disclosure. The exemplary algorithm may be implemented at PTU's controller (e.g., controller 316, FIG. 3) or at a different controller associated with the PTU. In an exemplary embodiment, the routines (and subroutines) of FIGS. 4A and 4B may be implemented at a processor circuitry in communication with a memory circuitry. The processor and the memory circuitries may communicate with a radio platform to exchange information with a PRU of a deice under charge (DUC).

Referring to FIG. 4A, at step 402 determination is made as to the operating mode of the PTU. If the PTU is in power save (PS) or idle mode, then the algorithm proceeds to step 404. At step 404 power loss (Ploss_PS) determination is made. In one embodiment, power loss for the PS mode is measured as a function of the output power of the PTU PA and the calibrated power consumption of the PA at long beacon for idle mat. An exemplary model for such calculation is provided at Equation (1) below. At step 406, power loss is compared to a predefine threshold and determination is made as to whether a rogue object is on or near the pad. If a rogue object is detected, PTU will go to latching fault state and then follow the A4WP specification to try to clear latching fault 3 times before going to permanent latching fault at step 408. If power loss is not detected, the algorithm ends at step 410. The detection algorithm may be repeated regularly. For example, the algorithm may be repeated once every 250 msec. or at different intervals as needed.

In an exemplary embodiment, power loss in PS mode is determined as a function of power output from the amplifier and the calibrated base power. The calibrated base power is the power consumption of PA at long beacon for idle mat. Equation (1) is an exemplary power loss calculation for a PTU in the power save mode.

$$Ploss\_PS = P\_PA - P\_base \qquad (1)$$

In Equation (1), P_PA is the power amplifier's measured power output and P_base is equipment-dependent and may be determined at calibration time. At step 406, a decision is made as to whether Ploss PS exceeds a threshold value. If Ploss_PS value is greater than a predefine threshold, then a rogue object event (ROE) is identified and PTU will go to latching fault state at step 408. The predefine threshold for Ploss_PS may be calculated apriori and programmed into a memory (not shown) associated with the controller (not shown) or the detector device (not shown). As will be discussed below, additional filtering measures can be added to steps 400-420 to prevent false positive detections by indicating a rogue object detected only after a number of positive detections are made out of a group of detections (e.g., 5 positive detections out of 8 detections).

If the PTU is in power transfer (PT) or low power mode, then a different sub-routine or algorithm may be implemented to determine power loss as shown in step 414. In certain embodiments, the power loss during PT mode may be determined as a function of several key variables as show in Equation (2):

$$Ploss\_PT = f(P\_PA, P\_rect, V\_drain, V\_coil, I\_coil, I\_PA, V\_PA, relayCount) \qquad (2)$$

Here, the input arguments for the functions are either power, voltage or current measured from sensing circuit. In Equation (2), P_rect is the power consumed by PRU, which may be measured at the PRU and relayed back from PRU to PTU through BLE communication; thus, P_rect denotes power at the PRU rectifier (e.g., rectifier 354, FIG. 3). V_drain denotes voltage at the transistor drain at the PTU. V_coil and I_coil denote, respectively, voltage across the PTU coil and current through the PTU coil (e.g., coil 318, FIG. 3). Similarly, V_PA and I_PA denote, respectively, voltage across the PTU PA (e.g., PA 212, FIG. 2) and current through the PTU PA. Once Ploss_PT is calculated, it can be compared to a second predetermined threshold value (step 416) to identify power loss (P-Loss PT). The threshold value for Ploss_PT may be determined apriori and stored at a memory (not shown) associated with the controller (not shown) or the detector device (not shown). If the calculated Ploss_PT value exceeds the second threshold value, then the PTU will go to latching fault state at step 418. If an ROE is not detected, the subroutine ends at step 420. The subroutine of steps 400-420 may also be repeated during set intervals to detect ROE. For example, a processor may be programmed to run an algorithm every 250 msec. As with the Ploss_PS a filtering system may be used to detect and discard false-positive detections.

The factors identified above can be combined in different permutations to arrive at Ploss-PT value. In one exemplary application, Equation (3) was applied as follows:

$$\begin{aligned}Ploss\_PT = &\ 0.8637*P\_PA - 11.236*(I\_coil\_mA/1000) + \\&\ 5.3481*(V\_drain\_mA/1000) + 1.0639*relay\text{-} \\&\ Count - 0.049229*Ppa*(I\_coil\_mA/1000) + \\&\ 0.020738*P\_PA*(V\_drain\_mV/1000) + \\&\ 0.0054691*Ppa*relayCount + 4.7252* \\&\ (I\_coil\_mA/1000)*(V\_drain\_mV/1000) + \\&\ 0.84574*(I\_coil\_mA/1000)*relayCount - \\&\ 0.22642*(V\_drain\_mV/1000)*relayCount - \\&\ 0.0034907*(Ppa)^2 - 7.286*(I\_coil\_mA/1000)^2 - \\&\ 1.4781*(V\_drain\_mV/1000)^2 - 0.049149* \\&\ (relayCount)^2 - 10.625 - P\_rect\end{aligned}$$

In Equation (3), both P_PA and P_rect are in unit of W, my, denotes millivolt, ma denotes milliamp. The numerical values in Equation (3) are coefficients which may be derived empirically or through experimentation with a given system. These coefficients may vary depending on the charging pad and other factors. In Equation (3), relayCount is the value of power amplifier's auto-tuning relay state. relayCount is an indication of added reactance in auto-tuning state. It is noted that Equation (3) is exemplary and non-limiting.

Referring again to FIG. 4A, if determination is made at step 402 that the PTU is in power save-charge complete (PS-CC) mode, (i.e., PTU is in power save state, but with charge-completed PRU remain on the charging pad), then the algorithm continues to step 422 of FIG. 4B. Here, Ploss can be measured in relation to Ploss_PS (for example, as defined in Equation 2) and any additional power loss. In one embodiment, the Ploss-PS-CC mode is calculated according to the Equation (4) as follows:

$$Ploss\_PS-CC = Ploss-PS-\text{Additional\_loss} \quad (4)$$

Ploss_PS can be calculated according to Eq. (1). In an exemplary application, Additional_loss was calculated using Equation (5) as follows:

$$\begin{aligned}\text{Additional\_loss} = &49.8885980112647 - \\ &84.4989534309425*(I\_coil\_ma/1000) - \\ &8.46785569668861*(V\_drain\_mv/1000) - \\ &0.444796695508015*\text{relayCout} + 0*(I\_coil\_ma/\\ &1000)*(V\_drain\_mv/1000) + \\ &0.622451712085283*(I\_coil\_ma/1000) \\ &*\text{relayCout} - 0.12790561070894*(V\_drain\_mv/\\ &1000)*\text{relayCout} + 44.039063495397*\\ &((I\_coil\_ma/1000)^2 + 2.02272275220789*\\ &(V\_drain\_mv/1000)^2 + 0.00940329186611616*\\ &(\text{relayCount})^2\end{aligned}$$

In one embodiment, the application of Equation (3) may be simplified by assuming a linear coefficient, eta, as shown in Equation (6) below:

$$Ploss\_PT = \text{eta}*P\_PA - P\_base1 - Prect \quad (6)$$

In Equation (6), the coefficients eta and P_base1 are implementation dependent and may be determined empirically or through experimentation.

Referring again to FIG. 4B, a determination is made at step 426 as to whether the calculated Ploss_PT value exceeds a third predetermined threshold. If Ploss_PT value is greater than a third threshold, then at step 428, an ROE is reported and the PTU state may be changed into latching fault state. If no ROE is detected, then the process ends at step 430. As in the other two subroutines, the process can be repeated at predefined intervals. In one embodiment, the threshold values 1 and 3 may be substantially similar.

In still another embodiment, an optional filtering step (not shown) may be added before each of PTU state change steps 408, 418 and 428. The filtering step can improve the disclosed algorithms by reducing false positive detections. An exemplary filter may include a shift register to receive input from the algorithm shown in FIGS. 4A and 4B. The shift register may receive incoming bits of data representing ROE events (e.g., 1 for detected ROE and 0 for no ROE detected) in a First-In-First-Out (FIFO) order. The shift register may have a length of N storage cells to receive bits corresponding to respective ROE detections. When the number of detected ROEs exceeds a filter constant, M, a rogue object detection indication may be used to change PTU state into latching fault state. Here, N and M are both integers. In an exemplary embodiment, the N value for detecting ROE in power save mode (step 404) or charge complete mode of power save state (PS-CC) may be set to 8 and M may be set to 5. In another exemplary embodiment, the N value for detecting ROE in Ploss-PT for power-transfer state can be set to 16 and the M value may be set to 10. A false ROE may be assumed if less than 10 ROE events (i.e., M=10) are detected in a set of 16 detections (i.e., N=16). Thus, random false ROE detections may be ignored without changing the PTU state to latching fault state.

Figure 5:
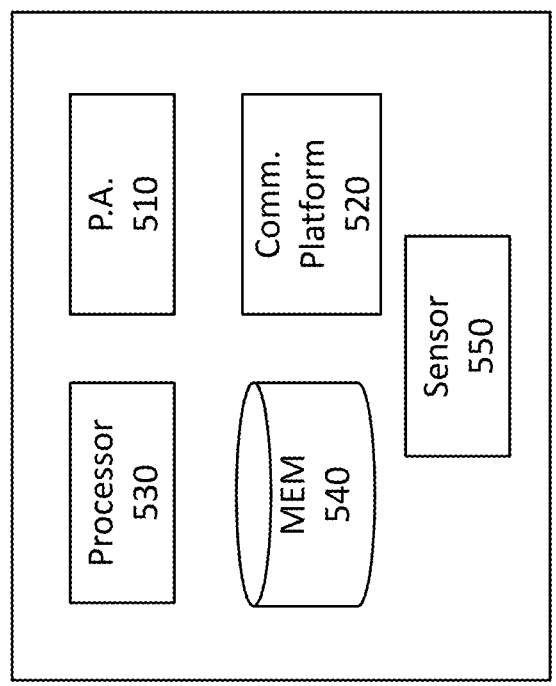
FIG. 5 illustrates an exemplary apparatus for implementing an embodiment of the disclosure.

FIG. 5 illustrates an exemplary apparatus for implementing an embodiment of the disclosure. Device 500 may comprise a separate device or it may be integrated with the PTU. Device 500 may be used to detect presence of one or more rogue objects on the wireless charging pad of a PTU (not shown). Device 500 includes power amplifier 510 to provide electromagnetic output to the PRU (not shown). Communication platform 520 may be a conventional BT/BLE system for communicating with the PRU. In an exemplary embodiment, communication platform 520 may include one or more radio circuitry, front-end radio processing circuitry (including software) and one or more antenna to engage a PRU in BLE packet exchange and communication. The communication platform may be a non-BLE platform. In an exemplary embodiment, the communication platform may communicate dynamic characteristics from the PRU. The dynamic parameter characteristics may include one or more of voltage or current at a rectifier or coil associated with the PRU (not shown).

Processing circuitry (interchangeably, processor) 530 may be an actual or a virtual processor. Processor circuitry 530 may comprise one or more processing modules or smaller processors. In one embodiment, processor 530 defines an applet executed on the control system (not shown) of the PTU. Processor 530 may communicate with power amplifier 510 and communication platform 520. Communication platform 520 may convey dynamic characteristics parameters received from the PRU. Processor 530 may also gauge output from power amplifier 510 to calculate power loss according to any of disclosed relationships. Processor 530 may be configured to run a filtering routine as described to abate false positive detections. Finally, processor 530 may take steps to change PTU state into latching fault state when an ROE is detected.

The following non-limiting exemplary embodiments of the disclosure are provided to further illustrate the disclosed embodiments. Example 1 is directed to a device to detect presence of a rogue object at or near a wireless charging pad of a Power Transmission Unit (PTU) configured to charge a Power Receiving Unit (PRU), the device comprising: a first processor to identify a PTU operating mode as one of power save (PS) mode, power transfer (PT) mode or power save charge-complete (PS-CC) mode, the first processor to receive one or more PTU charging parameters; a second processor to receive one or more received PRU power characteristics including one or more of voltage, current or power received at a PRU rectifier; and a third processor to determine a PTU power loss value as a function of one or more of the PRU received power characteristics, one or more of the PTU charging parameters and the PTU operating mode, the third processor further configured to detect presence of the rogue object if the calculated power loss exceeds a predefined threshold.

Example 2 is directed to the device of example 1, wherein the PTU charging parameters including power output at a PTU power amplifier (PA), a drain voltage value at (V_drain) at PA transistor, a PTU resonator voltage value (V_coil), a PTU resonator current value (I_coil), a current value at PTU PA (I_PA) and a voltage value at PTU PA (V_PA), relayCount to indicate added reactance in auto-tuning state, a baseline power (P_base) value for the calibrated power consumption of power amplifier during a long beacon for idle mat, and any additional amplifier power loss.

Example 3 is directed to the device of any preceding example, wherein the third processor determines PTU power loss value at PS mode as a function of the PTU power amplifier's power (P_PA) value and the base power (P_base) value for the calibrated power consumption of power amplifier during a long beacon for idle mat.

Example 4 is directed to the device of any preceding example, wherein the third processor repeats steps (a)-(e) for N consecutive events, to detect presence of a rogue object if the rouge object is detected for M of the N events, wherein N and M are integers and where in N is greater than M.

Example 5 is directed to the device of any preceding example, further comprising a communication platform including a radio, front-end receiver and an antenna to receive the one or more PRU power characteristics from the PRU.

Example 6 is directed to the device of any preceding example, wherein the predefined threshold is selected as a function of the operating mode.

Example 7 is directed to a method to detect presence of a rogue object at or near a wireless charging pad of a Power Transmission Unit (PTU) configured to charge a Power Receiving Unit (PRU), the method comprising: (a) identifying a PTU operating mode as one of power save (PS) mode, power transfer (PT) mode or power save charge-complete (PS-CC) mode; (b) receiving one or more PRU received power characteristics including one or more of voltage, current or power received at a PRU rectifier; (c) receiving one or more PTU charging parameters; (d) determining a PTU power loss value as a function of one or more of the PRU received power characteristics, one or more of the PTU charging parameters and the PTU operating mode; and (e) detecting presence of the rogue object if the calculated power loss exceeds a predefined threshold.

Example 8 is directed to the method of any preceding example, wherein the PTU charging parameters including power output at a PTU power amplifier (PA), a drain voltage value at (V_drain) at PA transistor, a PTU resonator voltage value (V_coil), a PTU resonator current value (I_coil), a current value at PTU PA (I_PA) and a voltage value at PTU PA (V_PA), relayCount to indicate added reactance in auto-tuning state, a baseline power (P_base) value for the calibrated power consumption of power amplifier during a long beacon for idle mat, and any additional amplifier power loss.

Example 9 is directed to the method of any preceding example, further comprising determining the PTU power loss value at PS mode as a function of the PTU power amplifier's power (P_PA) value and the base power (P_base) value for the calibrated power consumption of power amplifier during a long beacon for idle mat.

Example 10 is directed to the method of any preceding example, further comprising repeating steps (a)-(e) for N consecutive events and detecting presence of a rogue object if the rouge object is detected for M of the N events, wherein N and M are integers and where in N is greater than M.

Example 11 is directed to the method of any preceding example, wherein receiving one or more PRU received power characteristics further comprises receiving Bluetooth Low Energy (BLE) communications from the PRU.

Example 12 is directed to the method of any preceding example, wherein the predefined threshold is selected as a function of the operating mode.

Example 13 is directed to a non-transitory computer readable medium comprising instructions when executed to cause one or more processor to perform a process comprising: (a) identify a PTU operating mode as one of power save (PS) mode, power transfer (PT) mode or power save charge-complete (PS-CC) mode; (b) receive one or more PRU received power characteristics including one or more of voltage, current or power received at a PRU rectifier; (c) receive one or more PTU charging parameters; (d) determine a PTU power loss value as a function of one or more of the PRU received power characteristics, one or more of the PTU charging parameters and the PTU operating mode; and (e) detect presence of the rogue object if the calculated power loss exceeds a predefined threshold.

Example 14 is directed to the medium of example 13, wherein the PTU charging parameters including power output at a PTU power amplifier (PA), a drain voltage value at (V_drain) at PA transistor, a PTU resonator voltage value (V_coil), a PTU resonator current value (I_coil), a current value at PTU PA (I_PA) and a voltage value at PTU PA (V_PA), relayCount to indicate added reactance in auto-tuning state, a baseline power (P_base) value for the calibrated power consumption of power amplifier during a long beacon for idle mat, and any additional amplifier power loss.

Example 15 is directed to the medium of any preceding example, wherein the instructions further cause the processor to determine the PTU power loss value at PS mode as a function of the PTU power amplifier's power (P_PA) value for the calibrated power consumption of power amplifier during a long beacon for idle mat.

Example 16 is directed to the medium of any preceding example, wherein the instructions further cause the processor to repeat steps (a)-(e) for N consecutive events and detecting presence of a rogue object if the rouge object is detected for M of the N events, wherein N and M are integers and where in N is greater than M.

Example 17 is directed to the medium of any preceding example, wherein the instructions further cause the processor to receive one or more PRU received power characteristics as Bluetooth Low Energy (BLE) packets from the PRU.

Example 18 is directed to the method of any preceding example, wherein the predefined threshold is selected as a function of the operating mode.

Example 19 is directed to a system to detect presence of a rogue object at or near a wireless charging pad of a Power Transmission Unit (PTU) configured to charge a Power Receiving Unit (PRU), comprising: a PTU having a power amplifier, a resonator, a communication platform, a power supply and a controller circuitry, the communication platform configured to communicate with the PRU; wherein the controller circuitry includes a memory circuitry configured to communicate with one or more of: a first processor to identify a PTU operating mode as one of power save (PS) mode, power transfer (PT) mode or power save charge-complete (PS-CC) mode, the first processor to receive one or more PTU charging parameters; a second processor to receive one or more received PRU power characteristics including one or more of voltage, current or power received at a PRU rectifier; and a third processor to determine a PTU power loss value as a function of one or more of the PRU received power characteristics, one or more of the PTU charging parameters and the PTU operating mode, the third processor further configured to detect presence of the rogue object if the calculated power loss exceeds a predefined threshold.

Example 20 is directed to the system of example 19, wherein the PTU charging parameters including power output at a PTU power amplifier (PA), a drain voltage value at (V_drain) at PA transistor, a PTU resonator voltage value (V_coil), a PTU resonator current value (I_coil), a current value at PTU PA (I_PA) and a voltage value at PTU PA (V_PA), relayCount to indicate added reactance in auto-tuning state, a baseline power (P_base) value for the calibrated power consumption of power amplifier during a long beacon for idle mat, and any additional amplifier power loss.

Example 21 is directed to the system of any preceding example, wherein the third processor determines PTU power loss value at PS mode as a function of the PTU power amplifier's power (P_PA) value and the base power (P_base) value for the calibrated power consumption of power amplifier during a long beacon for idle mat.

Example 22 is directed to the system of any preceding example, wherein the third processor repeats steps (a)-(e) for N consecutive events, to detect presence of a rogue object if the rouge object is detected for M of the N events, wherein N and M are integers and where in N is greater than M.

Example 23 is directed to the system of any preceding example, wherein the communication platform includes a radio, front-end receiver and an antenna to receive the one or more PRU power characteristics from the PRU.

Example 24 is directed to the system of any preceding example, wherein the predefined threshold is selected as a function of the operating mode.

Example 24 is directed to a Machine-readable storage including machine-readable instructions, when executed, to implement a method or realize an apparatus as exampled in an y preceding example.

Example 25 is directed to an apparatus to detect presence of a rogue object at or near a wireless charging pad of a Power Transmission Unit (PTU) configured to charge a Power Receiving Unit (PRU), comprising: (a) means for identifying a PTU operating mode as one of power save (PS) mode, power transfer (PT) mode or power save charge-complete (PS-CC) mode; (b) means for receiving one or more PRU received power characteristics including one or more of voltage, current or power received at a PRU rectifier; (c) means for receiving one or more PTU charging parameters; (d) means for determining a PTU power loss value as a function of one or more of the PRU received power characteristics, one or more of the PTU charging parameters and the PTU operating mode; and (e) means for detecting presence of the rogue object if the calculated power loss exceeds a predefined threshold.

Example 26 is directed to the apparatus of example 25, wherein the PTU charging parameters including power output at a PTU power amplifier (PA), a drain voltage value at (V_drain) at PA transistor, a PTU resonator voltage value (V_coil), a PTU resonator current value (I_coil), a current value at PTU PA (I_PA) and a voltage value at PTU PA (V_PA), relayCount to indicate added reactance in auto-tuning state, a baseline power (P_base) value for the calibrated power consumption of power amplifier during a long beacon for idle mat, and any additional amplifier power loss.

Example 27 is directed to the apparatus of any preceding example, further comprising means for determining the PTU power loss value at PS mode as a function of the PTU power amplifier's power (P_PA) value and the base power (P_base) value for the calibrated power consumption of power amplifier during a long beacon for idle mat.

Example 28 is directed to the apparatus of any preceding example, further comprising repeating steps (a)-(e) for N consecutive events and detecting presence of a rogue object if the rouge object is detected for M of the N events, wherein N and M are integers and where in N is greater than M.

Example 29 is directed to the apparatus of any preceding example, wherein means for receiving one or more PRU received power characteristics further comprises means for receiving Bluetooth Low Energy (BLE) communications from the PRU.

Example 30 is directed to the apparatus of any preceding example, wherein the predefined threshold is selected as a function of the operating mode.

Example 31 is directed to a machine-readable medium including code, when executed, to cause a machine to perform the method of any of examples 25-30.

While the principles of the disclosure have been illustrated in relation to the exemplary embodiments shown herein, the principles of the disclosure are not limited thereto and include any modification, variation or permutation thereof.

What is claimed is:

1. A method to detect presence of a rogue object at or near a wireless charging pad of a Power Transmission Unit (PTU) configured to charge a Power Receiving Unit (PRU), the method comprising:
    (a) identifying a PTU operating mode as one of power save (PS) mode, power transfer (PT) mode or power save charge-complete (PS-CC) mode;
    (b) receiving one or more PRU received power characteristics including one or more of voltage, current or power received at a PRU rectifier;
    (c) receiving one or more PTU charging parameters;
    (d) determining a PTU power loss value as a function of one or more of the PRU received power characteristics, one or more of the PTU charging parameters and the PTU operating mode; and
    (e) detecting presence of the rogue object if the calculated power loss exceeds a predefined threshold
    wherein the (PS-CC) mode defines a mode where PTU is in power save state while a charge-completed PRU remain on the charging pad, and
    wherein the PTU charging parameters includes power output at a PTU power amplifier (PA), a drain voltage value at (V_drain) at PA transistor, a PTU resonator voltage value (V_coil), a PTU resonator current value (I_coil), a current value at PTU PA (I_PA) and a voltage value at PTU PA (V_PA), relayCount to indicate added reactance in auto-tuning state, a baseline power (P_base) value for the calibrated power consumption of power amplifier during a long beacon for idle mat, and any additional amplifier power loss.

2. The method of claim 1, further comprising determining the PTU power loss value at PS mode as a function of the PTU power amplifier's power (P_PA) value and the base power (P_base) value for the calibrated power consumption of power amplifier during a long beacon for idle mat.

3. The method of claim 2, further comprising repeating steps (a)-(e) for N consecutive events and detecting presence of a rogue object if the rouge object is detected for M of the N events, wherein N and M are integers and where in N is greater than M.

4. The method of claim 1, wherein receiving one or more PRU received power characteristics further comprises receiving Bluetooth Low Energy (BLE) communications from the PRU.

5. The method of claim 1, wherein the predefined threshold is selected as a function of the operating mode.

6. A non-transitory computer readable medium comprising instructions when executed to cause one or more processor to perform a process comprising:
    (a) identify a PTU operating mode as one of power save (PS) mode, power transfer (PT) mode or power save charge-complete (PS-CC) mode;
    (b) receive one or more PRU received power characteristics including one or more of voltage, current or power received at a PRU rectifier;

(c) receive one or more PTU charging parameters;
(d) determine a PTU power loss value as a function of one or more of the PRU received power characteristics, one or more of the PTU charging parameters and the PTU operating mode; and
(e) detect presence of the rogue object if the calculated power loss exceeds a predefined threshold wherein the PTU charging parameters including power output at a PTU power amplifier (PA), a drain voltage value at (V_drain) at PA transistor, a PTU resonator voltage value (V_coil), a PTU resonator current value (I_coil), a current value at PTU PA (I_PA) and a voltage value at PTU PA (V_PA), relayCount to indicate added reactance in auto-tuning state, a baseline power (P_base) value for the calibrated power consumption of power amplifier during a long beacon for idle mat, and any additional amplifier power loss.

7. The medium of claim 6, wherein the instructions further cause the processor to determine the PTU power loss value at PS mode as a function of the PTU power amplifier's power (P_PA) value for the calibrated power consumption of power amplifier during a long beacon for idle mat.

8. The medium of claim 6, wherein the instructions further cause the processor to repeat steps (a)-(e) for N consecutive events and detecting presence of a rogue object if the rouge object is detected for M of the N events, wherein N and M are integers and where in N is greater than M.

9. The medium of claim 6, wherein the instructions further cause the processor to receive one or more PRU received power characteristics as Bluetooth Low Energy (BLE) packets from the PRU.

10. The method of claim 6, wherein the predefined threshold is selected as a function of the operating mode.

* * * * *